Fig. 1

INVENTOR
JOHN D. BENNETT
BY Donald R. Johnson
ATTORNEY

Dec. 2, 1969  J. D. BENNETT  3,481,720
PROCESS AND APPARATUS FOR THE DISTILLATION OF SOLIDS
Filed April 29, 1966  3 Sheets-Sheet 2

INVENTOR
JOHN D. BENNETT
BY Donald R. Johnson
ATTORNEY

Dec. 2, 1969  J. D. BENNETT  3,481,720
PROCESS AND APPARATUS FOR THE DISTILLATION OF SOLIDS
Filed April 29, 1966  3 Sheets-Sheet 3

INVENTOR
JOHN D. BENNETT
BY Donald R. Johnson
ATTORNEY

United States Patent Office 3,481,720
Patented Dec. 2, 1969

3,481,720
PROCESS AND APPARATUS FOR THE
DISTILLATION OF SOLIDS
John D. Bennett, Richardson, Tex., assignor to Sun Oil
Company, Philadelphia, Pa., a corporation of New
Jersey
Filed Apr. 29, 1966, Ser. No. 546,225
Int. Cl. C10b 1/10, 47/30, 53/06
U.S. Cl. 48—89                    14 Claims

ABSTRACT OF THE DISCLOSURE

A pyrolytic process for the extraction of gaseous products from solids such as oil shale utilizes a rotating vessel separated radially into two principal zones, a central retorting zone and an outer (annular) combustion zone. Fresh raw solids are mixed with hot spent solids and passed through the retorting zone, to retort the raw solids to thereby produce gaseous products which are removed from this zone. Spent material derived from the retorting zone is passed through the combustion zone, and in this latter zone the combustible deposit on the spent material is burned, thereby to produce the hot spent solid material which is used for supplying the heat in the retorting zone. The vessel also includes a preheat zone, for preheating the raw solids prior to their entry into the retorting zone.

The present invention relates to an improved process and rotary retort for the distillation of solids containing volatilizable constituents. More particularly, the invention is concerned with an improved process for the distillation of carbonizable solids such as various oil-bearing minerals including oil shale, oil sands (tar sands), coals, lignite, cellulosic materials, and the like, and with a novel rotary retort useful for this process.

Rotary kilns (retorts) have been used heretofore for various heat treating operations (such as calcination, drying, distillation, and other treatments) on subdivided solids. Such treatments have invariably required an efficient heat exchange between solids and gases. Such heat exchanges have always been difficult to carry out in an efficient manner, and various arrangements have been resorted to in an attempt to make them more efficient; however, all of these arrangements involve certain disadvantages or drawbacks, so that the problem has never been completely or satisfactorily solved.

The present invention obviates the aforementioned difficulties by utilizing, for the retorting or distillation, a heat exchange between two solids which are in direct and intimate contact with each other, rather than a heat exchange between a solid and a gas. The invention affords additional advantages, as will become apparent from the subsequent description of the invention.

In accordance with the present invention, the processing of the material takes place in a large horizontally-disposed rotary drum or rotary retort, which is rotated at a relatively slow rate of speed about its substantially horizontal longitudinal axis by a suitable driving means. The internal construction of the vessel or drum is such (as will later be detailed) that the rotation thereof can cause solid material to travel longitudinally of the drum. Fresh solid raw material (such as oil shale, oil sands, etc.) is fed into one end of the drum, and gaseous products are removed from the other end thereof. Disposable solid waste material is removed from the first-mentioned end of the drum. The subdivided solid (fresh raw material) to be subjected to a distillation or similar heat treatment (if the raw material is oil shale, it should first be subjected to a crushing operation, to reduce the average particle size to one suitable for easy materials handling) is first passed through a preheating zone in the vessel, wherein it is heated to a temperature on the order of 200°–300° F. During this preheating, moisture present in the raw material feed may be driven off in the form of steam.

The preheated material then enters one end of a retorting zone, and as it does so, it is mixed directly with hot solid material, which latter may be at 1400°–1600° F. This initial partial mixing (with the resulting increase in temperature of the preheated raw material) drives off volatilizable constitutents, the evolved gases escaping through a gas collecting system as gaseous products. As the mixture of hot solid material and fresh raw material gradually travels toward the other end of the retorting zone, more thorough mixing takes place, the raw material increasing in temperature and more gases being driven off through the collecting system.

By the time the raw material reaches the distant end of the retorting zone, it has reached a temperature on the order of 900° F. and it is not desirable to extract further products from it; however, it has a combustible (carbon, or coke) deposit thereon. From the far end of the retorting zone, the spent solid material is fed through a choke feeding arrangement into the initial end of a combustion or fire zone which surrounds the retorting zone, and through which the combustible material travels in a direction opposite to the direction of travel through the retorting zone. Air or other oxygen-containing gas is fed into the combustion zone. Combustion of the combustible deposit on the spent material takes place in the combustion zone, causing the spent material (mainly shale particles, or sand particles, depending of course upon the type of raw material which is fed into the apparatus) to become heated to an elevated temperature (on the order of 1400°–1600° F.) as it travels from one end of the combustion zone to the other.

When the hot spent raw material reaches the terminal end of the combustion zone (which latter end is near the initial end of the retorting zone), it is separated into two portions. A first portion is fed back into the initial end of the retorting zone, and this portion constitutes the hot solid material which is mixed in the retorting zone with the incoming fresh raw material, and which gives up heat to such fresh raw material, thereby to bring about the previously-described distillation or retorting of the raw material.

The second portion of the hot spent raw material is removed from the apparatus as waste, but gives up most of its heat to the fresh raw material in the preheating zone (which zone has the form of a heat exchanger through which the fresh raw material passes on its way to the retorting zone).

A portion of the flue gas (which passes out of the apparatus at the same end thereof as the waste) may if desired be fed into the combustion zone along with the air or other combustion-supporting gas. Also, fresh raw shale, or some other type of fuel, may if desired be fed into the combustion zone, along with the spent material.

The preheating zone, the retorting zone, the gas collecting system, and the combustion zone are all contained within the outer shell of the retort, which latter (as previously stated) is rotated bodily about its substantially horizontal axis.

A detailed description of the invention follows, taken in conjunction with the accompanying drawings, wherein.

The apparatus of the invention will be described below using the distillation of oil shale as an example for the utility of the process of the invention. It is noted, however, that systems of this type may be used in a substantially analogous manner for the distillation or carbonization of other carbonizable materials, and quite generally for the recovery of volatilizable constituents from sub-divided solids containing the same.

For reference purposes, data on typical oil shale will now be given. One ton (0.56 cu. yd.) of oil shale contains 326 lbs. of organic matter, 1646 lbs. of calcite, dolomite, analcite, etc., and 28 lbs. of water, sulfur, and nitrogen. Upon retorting, the kerogens (bituminous materials in the oil shale) are thermally cracked, yielding (per ton of raw shale) 5800 cu. ft. of combustible gas and 30 gals. of oil, and leaving 1720 lbs. (amounting to 0.76 cu. yd.) of spent shale.

The gas produced may have an analysis of 27% carbon dioxide, 5% hydrogen, 4.5% methane and higher hydrocarbons, 0.5% carbon monoxide, and 50% nitrogen.

The oil may be a viscous, waxy liquid of low gravity (20° API, for example) and high pour point (75° to 90° F.), containing 0.6% sulfur and 2.0% nitrogen. The stated amount of oil (30 gals.) can yield, by further refining, 0.6 gal. of LPG, 14.3 gals. of motor fuel, 10 gals. of diesel fuel, 0.6 gal. of heavy fuel oil, and 40# of coke.

Figure 1:
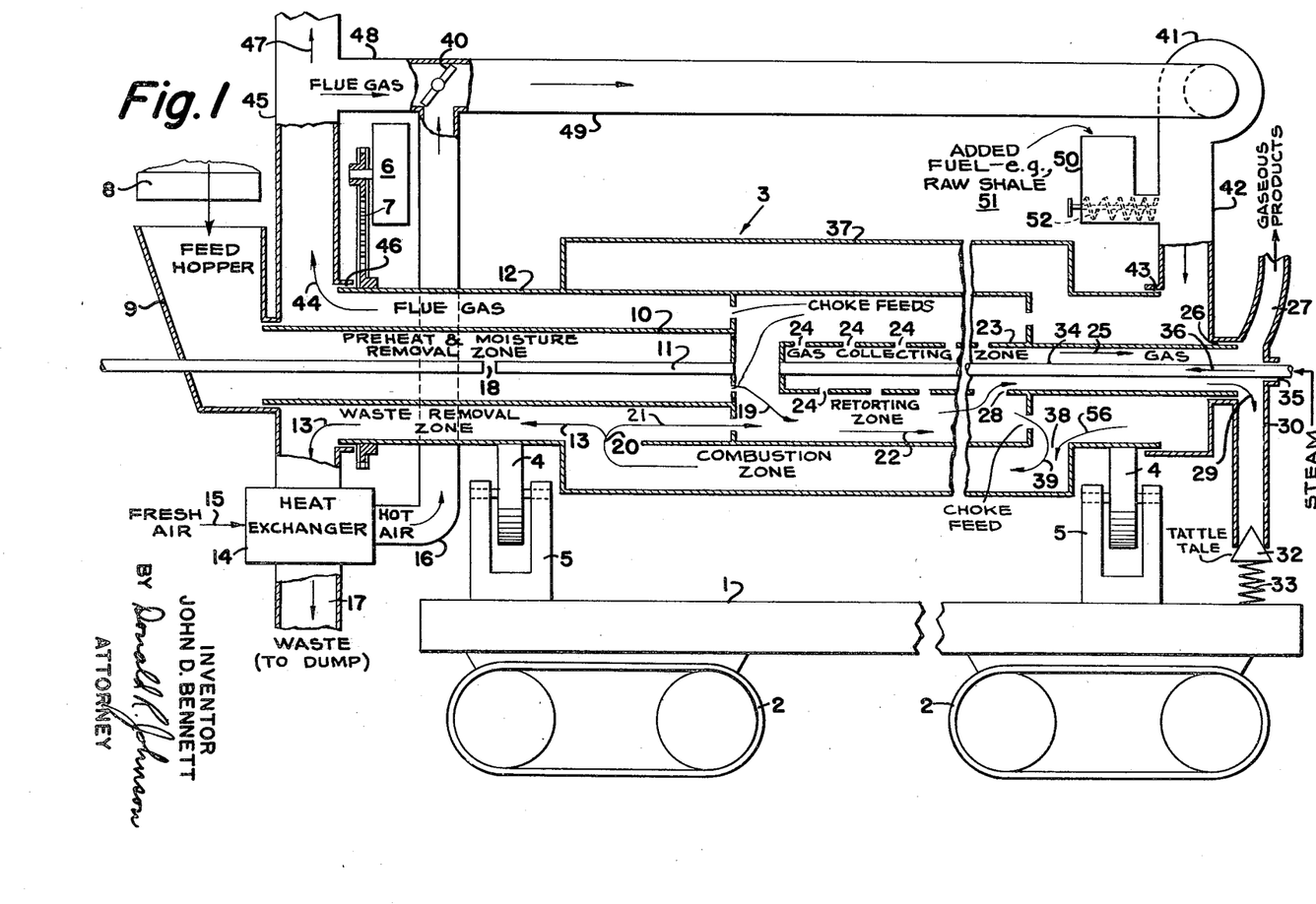
FIG. 1 is a simplified schematic illustration of the apparatus of this invention, representing the flows of the various materials through the apparatus and thus being similar to a flow diagram.

Referring now to FIG. 1, the apparatus includes a rotating retort together with certain auxiliaries. All of this apparatus is mounted on a suitable supporting base 1 which is in turn mounted on caterpillar type carriages 2 adapted to travel along the ground. The unit is provided with suitable propulsion means (not shown), which causes the carriages 2 to move along the ground, and is provided with a loader, so the unit can pick up raw material (e.g., oil shale) on one side of the line of travel of the unit, process this material, and lay down the waste material on the opposite side from the raw material, thereby eliminating expensive material handling equipment. The rate of travel of the unit is slow enough to allow power for propulsion, for rotating the retort, and for operating the auxiliaries to be brought to the unit by means of a flexible electric cable.

The gaseous products would be carried away from the unit by low pressure flexible hoses, similar to those customarily used in known arrangements for loading tankers at sea.

An elongated retort 3, generally cylindrical in shape, is supported in horizontal position by base 1 and is mounted for rotation about its longitudinal axis by means of a pair of spaced rollers 4, which engage the outer cylindrical surface of the retort 3 and are journaled for rotation in bearing supports 5 mounted on base 1. In a model which was actually built and successfully tested, the rotating retort 3 had a maximum O.D. of 25 inches and a length overall of about 16½ feet. The retort 3 is rotated at a low rate of speed (e.g., in the range of 0.5–2 r.p.m.) by means of an electric motor 6 supported on base 1 and mechanically coupled to retort 3 by a driving means 7, which may include suitable gearing. The driving means 7 may include by way of example, a roller chain which passes around the outer periphery of a casing 12 (which forms a part of retort 3) and also around a sprocket wheel driven from motor 6.

The material to be processed by the apparatus of this invention can be oil shale, tar sands, or any of the other solid materials previously mentioned. The smaller the size of the solid particles, the better the apparatus will handle the materials.

The process carried out by the apparatus of the invention will now be described, in connection with FIG. 1; additional structural details of the apparatus itself will be described later. In operation (assuming that oil shale is being processed), fresh oil shale crushed to a suitable size of, say, about ten mesh to one-inch particle diameter is picked up by a conveyor system 8 and dumped into a feed hopper 9 which is fixedly secured to base 1. The means for mounting the relatively fixed auxiliaries (such as motor 6, feed hopper 9, etc.) on base 1 has not been shown, in order to simplify the drawings as much as possible.

From the lower end of hopper 9, the fresh raw material is fed into the left-hand or feed end of the retort 3 by a feeding means which is adapted to transport subdivided solids at a controlled rate. A screw conveyor or auger may be used here, as will be more fully described subsequently. More specifically, the fresh raw material is fed by the aforementioned feeding means (which serves as a metering device, to bring in the correct amount of raw material) into the left-hand end of a pipe 10 which is disposed concentrically within the outer shell of retort 3 and which rotates therewith. A rotary seal coupling, of known type, is provided at the junction between the stationary feed hopper 9 and the rotating pipe 10. In the aforementioned model which was actually built, the pipe 10 was some eight feet in length and was of a nominal diameter of eight inches. A concentric straight tube 11 of smaller diameter is mounted within pipe 10, and rotates therewith. The pipe 10 is surrounded throughout the major portion of its length by a concentric casing 12 of larger diameter which, like pipe 10, forms a part of retort 3 and rotates therewith. In the aforementioned model, casing 12 was a 16" O.D. casing and was about sixteen In a manner which will be more completely described hereinafter, the fresh raw material is caused to move from left to right through pipe 10, as the retort 3 rotates. The means which causes the movement of the fresh raw material as described provides a choke feeding action, to bring fresh bulk materials into the apparatus while preventing the escape of gases back through pipe 10.

As retort 3 rotates, hot waste solid material (initially at a temperature of 1400°–1600° F., for example) is caused to move from right to left through the "waste removal zone" portion of casing 12, in the direction of arrows 13, by a means which will be described hereinafter. Heat exchange takes place through the wall of pipe 10, the hot waste material serving to preheat the fresh raw material so that the temperature of the latter, at the right-hand end of pipe 10, may be about 200°–300° F. This preheating helps to conserve energy that would otherwise be wasted in the disposed of or waste material.

Further heat is removed from the waste material by passing this material out of the open left-hand end of casing 12 to and through a further heat exchanger 14 to which fresh air (or other oxygen-containing gas) is supplied at 15. A rotary seal coupling is provided at the junction between the duct (which extends from casing 12 to exchanger 14) and the left-hand end of casing 12. The heated air leaves the heat exchanger 14 via a duct 16, and is thereafter used for combustion purposes, as will be later described.

The waste material, which may enter the heat exchanger 14 at a temperature on the order of 300° F., leaves this exchanger via pipe 17 at a lower temperature, and is then finally disposed of or dumped. It is this waste which is laid down, as the unit travels, on the opposite side of the line of travel (of the unit) from that of the fresh raw material pickup; this was mentioned previously.

It has been found advantageous to drive out as much moisture as possible from the raw material (shale) before the retorting of the oil starts. In this connection, it will be recalled that raw shale ordinarily contains an appreciable amount of moisture. The removal of moisture is the function of the axial moisture escape tube 11 which is located in the "preheat and moisture removal" zone. Tube 11 extends througout the length of pipe 10, and in addition extends out through the bottom of hopper 9, to a point beyond the left-hand side of the same. Tube 11 has therein one or more steam vent holes 18 (to admit steam to the interior of this tube) at about the midpoint of the length thereof; these holes are located as far in (from the left-hand end of pipe 10) as necessary to collect the steam generated as the fresh raw material is raised in temperature by preheating, but not far enough in to collect any gaseous products that might be produced. To the left of holes 18 the tube 11 is open all the way to the left-hand end thereof, but this tube is plugged to the right of holes 18 so that any gas formed as the charge or raw shale gets hotter will travel to the right with the charge, and proceed into the next zone of the retorting apparatus. In connection with this removal of moisture as described, it is pointed out that the shale has a certain amount of porosity, so that any steam (vaporized water or moisture) formed in the material in the vicinity of holes 18 can work its way through such material and into holes 18. Any gas formed to the right of holes 18 is retained in the pores of the charge, and proceeds with the charge into the next following zone of the apparatus.

The preheated fresh raw material, upon reaching the right-hand end of pipe 10, drops out the open end of this pipe and into a chamber formed by a continuation of casing 12, as indicated by arrow 19; this chamber provides the retorting zone of the apparatus. As previously stated, a choke feeding arrangement is provided in pipe 10, so that any gases which may be produced in the retorting zone of the apparatus are prevented from escaping back through pipe 10 into the hopper 9. In other words, the feeding means in pipe 10 is so arranged that the solids content of this pipe exhibits a gas flow resistance sufficiently high to provide an effective gas seal preventing gases from escaping through pipe 10.

A stream of hot spent solid material, which may be at a temperature of 1400°–1600° F., appears at the outlet end of a combustion zone, to be later referred to in more detail. The total stream is split at 20 by means of an adjustable proportioning device into two paths, one of which extends at 13 through the waste removal zone as previously described; the material which follows this path is of course discarded as waste, in the manner previously described. The material which follows the other of the two paths just mentioned is recycled through the apparatus. This other path extends from the splitting point 20 in the direction of arrow 21, toward the right in casing 12, to a vertical plane aligned with the right-hand end of pipe 10. The hot spent material which is being recycled is caused to move in casing 12 in the direction of arrow 21, as the retort 3 rotates. The means which causes the movement of the hot spent recycled material provides a choke feeding action, to bring this recycled material into the retorting zone while preventing the escape of gases back into the combustion zone or into the waste removal zone.

The hot recycled material, moving through casing 12 in the direction of arrow 21, reaches the vertical plane of the right-hand end of pipe 10 and enters the retorting zone, which as previously indicated begins at such plane. The preheated fresh raw material, at 200°–300° F. for example, enters the retorting zone at 19 from pipe 10, to be therein mixed with the hot recycled material (at 1400°–1600° F.) which reaches this zone after having traveled in casing 12 in the direction of arrow 21. The two streams of solid material are moved together in direct physical contact from left to right through the retorting zone, in the direction of arrow 22, and become more thoroughly admixed as they travel through the retorting zone. Since the hot recycled material moves through the retorting zone in the same direction as, and in direct physical contact with, the preheated fresh shale, a heat exchange takes place which heats the fresh raw shale to a retorting temperature wherein thermal cracking of the fresh shale takes place. When the fresh raw shale reaches a temperature of about 800°–1000° F. its kerogen content is broken down to hydrocarbon vapors. That is to say, the partial mixing which takes place at the left-hand end of the retorting zone (just to the right of the right-hand end of pipe 10) will cause gases to be evolved from the fresh raw shale. These gases comprise product gas, being hydrocarbon vapors which are removed from the retorting zone by a gas collecting system, now to be described.

A tube 23 is mounted concentrically within the outer shell of retort 3 and rotates therewith; the left-hand end of this tube is located in a vertical plane near to but spaced somewhat from the right-hand end of pipe 10. In the aforementioned model which was actually built, tube 23 was about nine feet long and had a nominal diameter of six inches. A plurality of apertures 24 are provided in the wall of tube 23, these apertures being spaced along the length of the tube.

Gases evolved from the heated fresh raw shale in the retorting zone enter the interior of tube 23 by way of the apertures 24, and proceed toward the right in tube 23, as indicated by arrow 25. A feeding means (to be subsequently described) is provided in tube 23, to assist in the removal of these gases, as well as of any solids which may end up in tube 23, from the retort, in the direction 25. The product gases, which are evolved from the fresh shale in the retorting zone as a result of thermal cracking, proceed toward the right in tube 23 and through a rotary seal coupling 26 at the right-hand end of this tube, into a low pressure flexible hose 27 which carries the gaseous products away from the retort for further processing, such as in a condenser and scrubber (not shown).

As previously stated, the partial mixing of the hot recycled material with the preheated fresh raw shale at the left-hand end of the retorting zone causes gases to be evolved from the raw shale, and these gases escape through the collecting system 23–26, as described. As the material in the retorting zone gradually moves along in the direction of arrow 22, the recycled and fresh components are more thoroughly mixed, and more gas is captured through further-along apertures or ports 24 in the collecting system. At the same time that this transfer of heat from particle to particle is taking place in the retorting zone, the metal wall of casing 12 is maintained in an envelope of heat (which keeps it hot); this envelope of heat is provided by the action taking place in a combustion zone (which will be described later) which surrounds the retorting zone portion of casing 12.

A tattle-tale hole 28, whose area is considerably larger than the areas of apertures 24, is provided in the wall of tube 23, at a location some little distance to the left of the right-hand end of casing 12. If for some reason the level of the solid material in the retorting zone becomes excessive, some of this solid material enters the interior of tube 23 via hole 28, and is caused to move in the direction 25 by the feeding means (previously described) provided in tube 23. This solid material moves out the end of tube 23 as indicated by arrow 29 into a stationary pipe 30 which extends downwardly from tube 23 and which is coupled by means of the rotary seal coupling 26 (previously referred to) to the right-hand end of tube 23. A tattle-tale closure 32, biased to closed position by means of a compression spring 33 one end of which is secured to base 1 and the other end of which is secured to closure 32, closes the lower end of pipe 30. When a sufficient amount of solid material accumulates in pipe 30, the weight of the same overcomes the force of spring 33, and out of pipe 30 onto base 1. This is observed by the operator, who may then make suitable adjustments to the apparatus to reduce the level of the solid material in the retorting zone.

A central tube 34 of small diameter is coaxially disposed within tube 23 and rotates therewith. Tube 34 is substantially coextensive with tube 23 and is open at its left-hand end; tube 34 has a rotary seal coupling 35 at its right-hand end through which it is connected to a suitable supply of steam, as indicated by legend. Steam may travel in the direction 36 for injection into the retorting zone, via the left-hand end of tube 24. Steam may be injected via tube 34 in order to help crack the carbon contained in the shale into "water gas." Alternatively, lean gas may be injected via tube 34, to help flush out the rich gas via tube 23.

An outer shell 37 of large diameter coaxially surrounds the right-hand end portion of casing 12, extending from a point just to the left of stream splitter 20 to a point some distance to the left of the rotary seal coupling 26 which is on tube 23. In the aforementioned model, shell 37 was about twenty-five inches in O.D. and a little less than 9½ feet long. The left-hand end of shell 37 is sealed to the outer surface of casing 12, and the right-hand end of this shell is also sealed to the outer surface of this same casing. The space between shell 37 and casing 12 provides a combustion zone.

The material traveling through the retorting zone as at 22 finally reaches a condition (during its cracking) such that it is not desirable to extract further products from it. This spent material then passes through a choke feeding arrangement provided in casing 12 into and through an aperture 38 of enlarged cross-sectional area provided in the wall of casing 12 (as indicated by arrow 39), dropping into the combustion zone in shell 37. The choke feeding arrangement just described separates the retorting zone from the combustion zone and prevents combustion gases from finding their way into the combustion zone. The right-hand end of shell 37 is secured to casing 12 at the right-hand edge of aperture 38.

The solid material issuing at 39 from the choke feeding arrangement and entering the combustion zone, though spent insofar as the removal of valuable products therefrom is concerned, nevertheless has a combustible carbonaceous (carbon, or coke) deposit or coating thereon, which may be burned to provide heat. For combustion, it is necessary to bring air (or other oxygen-containing gas) into the combustion zone. The hot air duct 16 extends by way of a rotary vane or damper 40 and a duct 49 to the intake of a centrifugal blower or fan 41. Assuming that vane 40 is in the position illustrated, hot fresh air alone is supplied to the intake of blower 41.

The exhaust or outlet of blower 41 is fed to a pipe 42 which is coupled to the right-hand end of casing 12 by means of a rotary seal coupling 43. Thus, with vane 40 in the position illustrated, hot fresh air alone is supplied from blower 41 to the right-hand end extension of casing 12, and through gap 38 to the right-hand end of the combustion zone.

Feeding means, which will be described in detail subsequently, is provided in the combustion zone, to move the material which is dumped at 39 into this zone toward the left, to stream splitter or adjustable proportioning device 20. Once the apparatus of the invention has reached operating temperature from a cold start-up, the oxygen-containing gas supplied to the combustion zone causes the combustible carbonaceous deposit (on the material supplied at 39 to the combustion zone) to become ignited and burn, resulting in a fire throughout the combustion zone which heats the particulate solid material (spent material) traveling through the combustion zone to a high temperature (on the order of 1400°–1600° F.) by the time this material reaches the outlet end of the combustion zone at 20. The feeding means in the combustion zone is of such a construction (as will be described subsequently) that a new surface is constantly being exposed to the air as the material travels through this zone. The feeding means also operates in such a manner that the hot combustion gases completely surround the retorting zone portion of casing 12, thus causing this casing to be in an envelope of heat to keep it hot.

The hot spent material which reaches the outlet end 20 of the combustion zone is split at 20 into the two paths 13 and 21 previously mentioned. That part of the hot spent material which follows path 21 is rerun or recycled, giving up heat to the preheated fresh material which drops at 19 into the retorting zone, as previously described. In this recycle process, the heat is transferred from particle to particle, since the recycled and fresh materials are both particulate solids. That part of the hot spent material which follows path 13 is removed from the apparatus as waste, but gives up heat to the fresh material in the preheat zone formed by pipe 10, as previously described.

The flue gases resulting from combustion in the combustion zone reach casing 12 in a region more or less vertically aligned with the outlet end 20 of this zone, and thus to the left of the choke feeding arrangement which feeds the hot recycled material (at 21) into the retorting zone. These flue gases are thus forced to move toward the left in casing 12, and these gases pass as at 44 into the lower end of a duct or stack 45 which is coupled through a rotary seal coupling 46 to the left-hand end of casing 12. The flue gases may be vented as at 47 to the atmosphere, or, since they may contain considerable heat, they may be mixed with the fresh air supplied to the combustion zone, so that use may be made of the heat they contain. A branch duct 48 extends from duct 45 to vane 40, so that (if vane 40 is rotated from the position illustrated in FIG. 1) flue gases may be fed from duct 45 into the duct 49, which extends to the intake of blower 41. Thus, by proper adjustment of vane 40, any desired portion of the hot flue gases may be mixed with the hot fresh air which is fed into the combustion zone.

According to this invention, fuel (e.g. in the form of fresh raw shale) may be fed directly into the combustion zone. This may be done to make certain that there will be some fire burning all along the combustion zone, which latter is very desirable. Should there not be enough combustibles left in the spent materials leaving the retorting zone to maintain the apparatus in operation (because of a deficiency in the heat available for cracking), additional heat may be added, in the form of fresh raw material, directly into the combustion zone. This has two principal advantages over the use of gas as additional fuel. In the first place, the gas has had to be produced from the raw material prior to this use, and can be sold or used elsewhere to better advantage. In the next place, the fresh solid raw material has not been handled through the retort and is rich in fuel, but can be burned only as it is moved all along the combustion zone; gas, on the other hand, would burn rapidly at one end of the zone, thereby causing excessive hot spots.

Also, the arrangement (to be described) for feeding solid material directly into the combustion zone has another advantage. If the retort of the invention were being used to process coal, there might not be enough solid material (ash) left, after burning in the combustion zone, for proper recycling (and heating of the fresh raw coal). In this case, it might be necessary to add some solid foreign material to the feed into the combustion zone, so that there would be sufficient residue after burning for proper recycling action.

The means for feeding fuel (e.g., fresh raw shale) or other solid material directly into the combustion zone will now be described. A hopper 50 adapted to contain the material to be added (e.g., fresh raw shale 51) is mounted to feed such material into pipe 42, between blower 41 and the rotary seal coupling 43. A screw conveyor 52, which serves as a feeding means adapted to transport subdivided solids at a controlled rate, is mounted at the lower end of hopper 50 for feeding the solid material 51 into pipe 42. Screw conveyor 52 rotates with respect to hopper 50 and pipe 42. The solid material fed toward the right by conveyor 52 falls down pipe 42 and drops onto a feeding means which extends between pipe 42 and gap 38 in the extension of casing 12 and which moves the said material as at 56 from pipe 42 to gap 38. When this added fuel reaches gap 38, it drops down into the combustion zone, as desired.

The apparatus described may be started up by using gas which may be available in the area, or else bottled butane. Such gas can be introduced into the combustion zone. For start-up, material would be fed through the machine just as if the carbon or coke deposit were burning in the combustion zone. Then, a fire would be lit in the combustion zone (using the gas as aforementioned) by a procedure similar to firing up a boiler. Once the retort has started producing gas of its own, the outside source of gas could be closed off and the retort would burn its own products, this continuing until the combustion zone has come up to operating temperature. Then, the retort would operate on the residual carbon or coke deposits on the spent shale, in the manner described above. Once started up, the apparatus would be operated continuously (in the manner of blast furnaces in the steel industry) until necessary to shut it down for some reason.

Figure 2A:
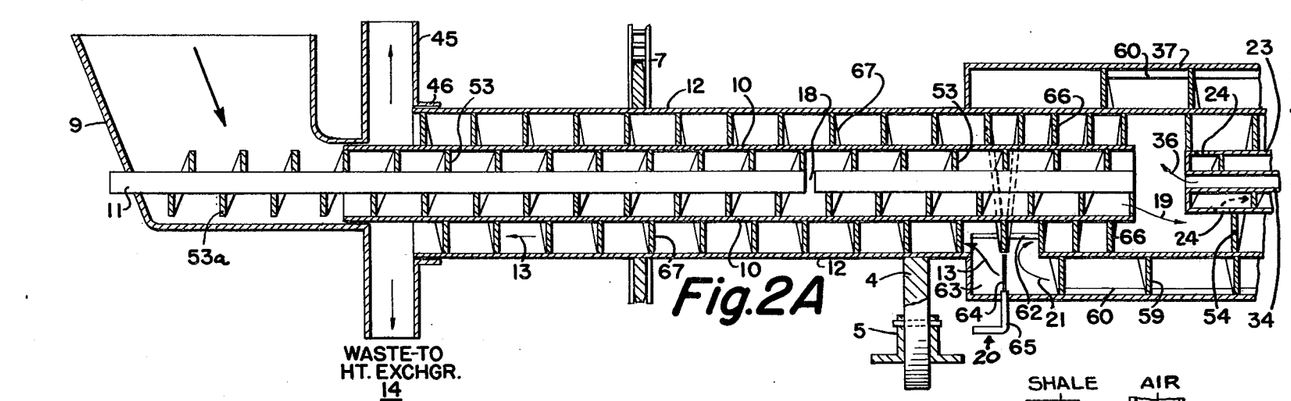
FIGS. 2A and 2B, placed end-to-end, form FIG. 2, which is a longitudinal section through an embodiment of the retorting apparatus of the invention.
Figure 2B:
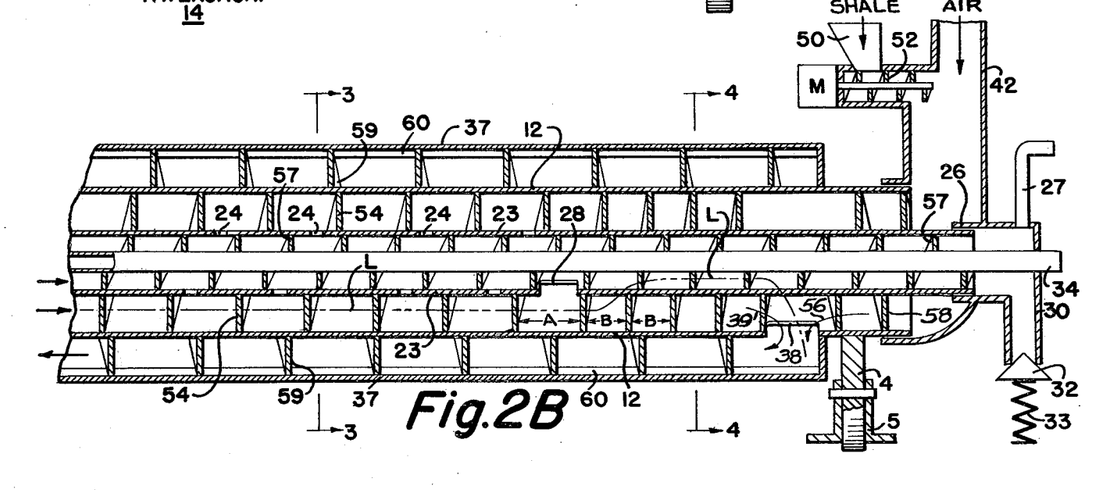

Refer now to FIGS. 2A-2B, which together make up FIG. 2 and which disclose the internal construction of the retort. Items 5, 6, 8, 9, 14, 16, 17, 27, 30, 32, 33, 40, 41, 42, 45, 48, 49, and 50 are described as stationary or fixed; by this is meant that they are stationary with respect to base 1 and do not move with respect thereto, although they do, of course, move with respect to the surface of the earth as base 1 travels on its caterpillar carriages 2. The retort 3 rotates with respect to base 1, as driven by motor 6 through the retort driving means 7. The rollers 4 journal retort 3 for rotation at a low rate of speed, such as 0.5 r.p.m.

The tubular items 10, 11, 12, 23, 34, and 37, which are all included in retort 3 and which comprise the basic components of the retort, are all coaxial and are secured together to rotate as a unit. These items rotate bodily together at a slow speed about a substantially horizontal axis which is common to all of them and which is the longitudinal center line of the smallest-diameter tubes 11 and 34. The rotation of this entire coaxial and generally cylindrical arrangement is made to occur by the action of the driving motor 6 as aforementioned.

The various means which feed the material through the retort utilize principles quite similar to that utilized in the so-called Archimedean screw, which has been defined as follows: "A device, attributed to Archimedes, consisting . . . of a broad-threaded screw encased by a hollow open cylinder, and used to raise water by rotating the apparatus when partially immersed in a slant-wise direction."

It will be assumed that the retort is rotating in a direction such that its upper edge appears to be moving away from the observer and its lower edge appears to be moving toward the observer. This means that, looking at the feed hopper 9 end of the retort 3, the direction of rotation is counterclockwise.

A continuous, uninterrupted auger or helix 53 (i.e., a broad-threaded screw), which is somewhat longer than pipe 10, is mounted within pipe 10 in such a position that it terminates at the right in the same vertical plane as the right-hand open end of this pipe but its left-hand end extends beyond the open left-hand end of the pipe. Auger 53 has a constant pitch throughout its length and may be similar to the augers customarily used in cotton gins; in the model retort previously referred to, this auger had an 8" O.D. and a 6" pitch. The "hand" of auger 53 is such that, for the assumed counterclockwise direction of rotation of the retort, it will move material from left to right into and through pipe 10.

Augers of the type described, as manufactured and sold commercially, are "wound around" and secured to a central straight tube; the said tube then comprises the water vapor tube 11, and has therein the steam hole 18, which latter may actually be a gap formed in the tube, between turns of the helix.

That portion 53a of auger 53 which extends beyond the left-hand end of pipe 10 extends into and through the lower portion of feed hopper 9. This "free" portion 53a of the auger is not surrounded by a moving case, so functions as an ordinary screw conveyor (similar to screw conveyor 52) to feed the fresh raw shale from hopper 9 into the left-hand open end of pipe 10. Tube 11 rotates with pipe 10 to rotate this "free" portion of the auger, and this portion 53a of the auger is 100% full at all times, assuming, of course, that the feed hopper 9 is kept sufficiently full of fresh raw shale.

The outer periphery of auger 53 is welded to the inner surface of pipe 10, but only for a few turns at the right-hand end of this auger. This provides a gas-tight seal at the radially-outer edge of the auger, between the auger and pipe 10 (toward the right-hand end of the auger). As previously mentioned, the radially-inner edge of the auger is secured and sealed to the outer surface of tube 11, throughout the length of the auger. This provides a gas-tight seal at the inner edge of auger 53.

As previously stated, during operation of the apparatus the pipe 10 rotates about its longitudinal center line or axis, and along with it the auger 53 which is secured thereto. (It will become apparent hereinafter how this rotation is brought about, as a result of the rotation of casing 12 by the driving means 7.) The particulate solid material (fresh raw shale) which is fed into the left-hand end of pipe 10 by the screw conveyor 53a moves upwardly along with the pipe wall with which it is in contact, but only until it reaches the normal angle of repose of the material, at which point it falls downwardly in something of a tumbling action, with the individual particles tumbling on top of other particles. As the material tumbles downwardly, it is constrained to move (that is to say, it is guided) laterally or sidewise, i.e., longitudinally of pipe 10, by the helix or auger 53, which (in combination with the inner wall of pipe 10 and the outer wall of tube 11) provides a helical guiding channel within this pipe. This is analogous to the action which occurs with water in the well-known Archimedean screw referred to previously, with the important difference that, with particulate solid material, any cross-sectional area of the pipe 10 can never become more than 50% full of solid material. This result is highly desirable, because the material cannot be moved through the pipe if the auger becomes 100% full; if this occurred, the material would simply have no place to move to.

The "hand" of auger 53 is such that, with the direction of rotation previously assumed (i.e., counterclockwise when looking at the feed hopper 9 end of the retort), the solid material entering the left-hand end of pipe 10 is caused to move to the right-hand end thereof. It will be seen that the pipe 10 and the auger 53 together comprise a feeding means which moves the fresh raw material from left to right through pipe 10.

As previously stated, the preheat pipe 10 will, during operation of the apparatus, be 50% full of solid material (raw material). This is amply sufficient to provide a choking action (as will be explained hereinafter, in connection with FIG. 4) by blocking the helical passage which gas could otherwise (i.e., in the absence of such blocking) follow to pass through pipe 10. As a result, fresh raw material may be moved through the preheat and moisture removal zone provided by pipe 10 into the retorting zone, while preventing the escape of gases back through pipe 10.

As previously described in connection with FIG. 1, as the fresh raw material moves from left to right through pipe 10, it is preheated (through heat exchange with the hot waste material moving from right to left as at 13 through casing 12), and moisture is driven off therefrom, in the form of steam.

As previously described, the preheated fresh raw material, upon reaching the right-hand end of pipe 10 (at which point auger 53 terminates), drops at 19 into the retorting zone provided within a continuation of casing 12.

In the embodiment illustrated in FIGS. 2A–2B, a continuous, uninterrupted auger or helix 54 is mounted within casing 12, using the tube 23 as its central tube; auger 54 extends from the left-hand end of tube 23 (which is rather close to the right-hand end of pipe 10) to the aperture 38. Auger 54 has a constant pitch for most of its length, but at the right-hand end portion thereof (specifically, from hole 28 to aperture 38) it has a smaller pitch, for a reason which will be explained hereinafter. The "hand" of auger 54 is the same as that of auger 53, so that, for the assumed direction of rotation of the retort, the former will cause solid material to move from left to right through casing 12.

For convenience in illustration and explanation, all of the various feeding means shown in FIGS. 2A and 2B comprise augers; however, as will be explained more fully hereinafter, it may be preferred in some instances to use assemblies of paddles or vanes (which provide open passages for the free flow of gas) for feeding purposes. By way of example, such a paddle or vane assembly can be used in the retorting zone being described, from a point just to the left of the tattle-tale hole 28 all the way to the left-hand end of tube 23.

The inner periphery of auger 54 is welded to the outer surface of tube 23 throughout the length of the former (just as the inner periphery of auger 53, previously described, is welded to the outer surface of tube 11). The outer periphery of auger 54 is welded to the inner surface of casing 12, but only at the right-hand end portion of the auger (to wit, to the right of hole 28). This provides gas-tight seals at both the inner and outer edges of auger 54.

The hot spent material which is being recycled moves in the direction of arrow 21 into the left-hand end of the retorting zone, as previously described; how this material is fed into the retorting zone will be subsequently described. The mixture of hot spent material and preheated fresh raw material is moved from left to right through the retorting zone by the action of casing 12 and auger 54 (which together comprise a feeding means), which action is quite similar to that previously described for the feeding means in preheat pipe 10. This feeding action takes place, of course, as casing 12 and auger 54 rotate as a unit; note that casing 12 is rotated directly by the driving means 7. During this movement through the retorting zone, heating and retorting (and thermal cracking) of the fresh raw material takes place, as previously described in connection with FIG. 1.

Throughout the major portion of its length, the retorting zone (during operation of the apparatus) is considerably less than 50% full, as indicated by the left-hand portion of phantom line L (which represents the approximate level of the material) in FIG. 2B. Notice that this left-hand portion of line L represents the material level to the left of hole 28, all of the apertures 24 being on the left-hand side of hole 28. Since this material level L is considerably below the bottom of tube 23, no solid material can enter tube 23 via the apertures 24. Any solid material which does perchance enter tube 23 will be removed by the tattle-tale arrangement 30, 32, etc. Conditions such as the pitch of the auger, the rotational speed of the retort, etc., govern the material level. See also FIG. 3, which is a vertical section through the apparatus approximately in the vertical plane 3—3 of FIG. 2B; the material 55 in this portion of the retorting zone occupies considerably less than 50% of the cross-sectional area of casing 12. This is the non-choking condition, wherein the helical passage formed by auger 54, the inner wall of casing 12, and the outer wall of tube 23, is not interrupted or blocked, but is open, so that gas can move freely along this passage.

Beyond or to the right of the hole 28, the pitch of auger 54 is decreased. That is to say, the auger pitch becomes steeper. This is indicated in FIG. 2B, wherein dimension A is greater than dimensions B. This smaller pitch dimension B is continued from the right-hand side of hole 28 all the way to aperture 38 in casing 12, at which aperture the auger 54 terminates. Since the same volume of material has to travel through the retorting zone per revolution of the retort, this steeper pitch B means that the level of the material will be higher in this section of the retorting zone, as indicated by the right-hand portion of line L in FIG. 2B. In other words, this portion of the auger fills up (as compared with level L to the left of hole 28). See also FIG. 4, which is a vertical section through the apparatus approximately in the vertical plane 4—4 of FIG. 2B. The material 55' in this portion of the retorting zone occupies approximately 50% (it can never be more than this, as previously noted) of the cross-sectional area of casing 12. This is the choking condition, wherein the helical passage formed by auger 54, the inner wall of casing 12, and the outer wall of tube 23, is interrupted or blocked by solid material, so that gas is effectively prevented from moving through this portion of casing 12.

Figures 3, 4, 5:
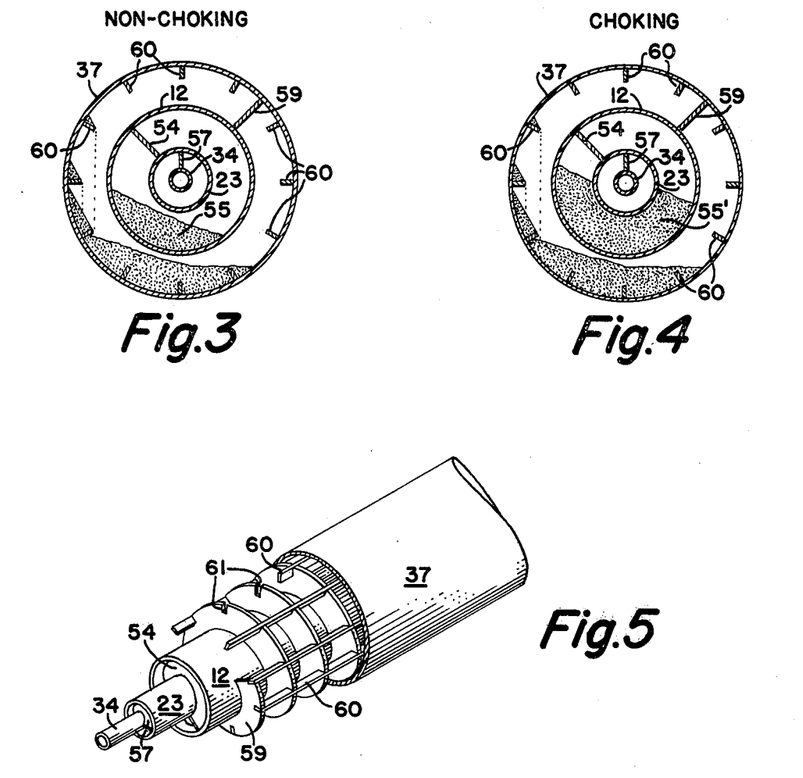
FIG. 3 is a transverse section taken approximately on the line 3—3 of FIG. 2B, and represents the non-choking condition.
FIG. 4 is a transverse section taken approximately on the line 4—4 of FIG. 2B, and represents the choking condition.
FIG. 5 is a partial isometric view, partly broken away, looking at the right-hand end of the combustion zone of the retort.

The representation of FIG. 4 may also be applied to preheat pipe 10, which (as previously stated) is 50% full of solid material. This results in a choking action in pipe 10.

A continuous, uninterrupted auger 57, coextensive with tube 23, is mounted within this tube, using tube 34 as its central tube. Auger 57 has a constant pitch throughout its length and may be a cotton-gin-type auger; in the model retort previously referred to, this auger had a 6″ O.D. and a 6″ pitch. The "hand" of auger 57 is the same as that of auger 53, so that, for the assumed direction of rotation of the retort, the former will cause any solid material in tube 23 to move from left to right therethrough. Likewise, the gases in this tube will be guided (by means of the helical passage formed by auger 57, the inner wall of tube 23, and the outer wall of tube 34) toward the right-hand end of tube 23.

The inner periphery of auger 57 is welded to the outer surface of tube 34 throughout the length of the auger, and the outer periphery of auger 57 is welded to the inner surface of tube 23, at one end only of the auger.

Tube 23, auger 57, and tube 34 rotate together as a unit. Tube 23 is driven from casing 12 through the auger 54, welded thereto, while tube 34 is in turn driven through the auger 57, which is welded between tubes 34 and 23. The rotation is about the substantially horizontal center line of tube 34, which is also the common longitudinal axis for tube 23, casing 12, and outer shell 37. Any solid material entering tube 23 through the tattle-tale hole 28 is moved to the right from this hole by the action of tube 23 and auger 57 (which together comprise a feeding means), which action is quite similar to that previously described for the feeding means in preheat pipe 10. Any solid material in tube 23 thus moves to the right-hand open end of tube 23 and falls into the tell-tale pipe 30; the gases in tube 23 are guided in the direction 25 (FIG. 1) and travel to the right-hand open end of tube 23, from whence they enter hose 27.

The retort is operated in such a manner that the tube 23 is always substantially less than 50% full, so that it is never full enough to choke. That is to say, it is always in the non-choking condition represented by FIG. 3.

A feeding means is provided at the right-hand end of casing 12, for feeding fresh fuel (e.g., raw shale) from pipe 42 in the direction 56 to aperture 38, which leads from casing 12 into the combustion zone. This feeding means is illustrated in FIG. 2B as comprising a continuous, uninterrupted auger 58 which is mounted within casing 12, using tube 23 as its central tube and extending from the right-hand end of casing 12 to the aperture 38 in this casing. Auger 58 has a constant pitch throughout its length, and the "hand" of auger 58 is opposite to that of auger 53, so that, for the assumed direction of rotation of the retort, the former will cause the solid material which drops down pipe 42 to move from right to left as at 56 through the right-hand end portion of casing 12, from the right-hand end thereof to aperture 38. When this last-mentioned solid material reaches aperture 38, it drops down into the combustion zone, along with the material which is fed at 39 from the retorting zone into the combustion zone.

The inner periphery of auger 58 is welded to the outer surface of tube 23, and, of course, auger 58, casing 12, and tube 23 rotate together, as a unit. Casing 12 and auger 58 together comprise a feeding means, and the feeding action which takes place at the right-hand end of this casing is quite similar to that previously described for the feeding means in preheat pipe 10, although it is of course in the reverse direction.

A paddle or vane assembly (of the type previously referred to in connection with the retorting zone) may be used at the right-hand end of casing 12, in the fresh fuel feed zone, instead of the auger 58.

The spent material leaves the right-hand end of the retorting zone through the choke feeding arrangement provided by the reduced-pitch portion of auger 54 and drops at 39 through the aperture 38 into the combustion zone provided by the outer shell 37. Fresh fuel, if used, drops at 56 through this same aperture, into the combustion zone.

Shell 37, being secured at its ends to the outer surface of casing 12, rotates with the latter about the common substantially horizontal axis of all of the tubular items.

A continuous, uninterrupted auger 59, somewhat shorter in length than shell 37, is mounted within this shell, using casing 12 as its central tube. Auger 59 extends from the right-hand end of shell 37 to a point somewhat short of the left-hand end thereof, and has a constant pitch throughout its length, which pitch is greater than the pitch of auger 53; in the aforementioned model, the pitch of auger 59 was ten inches. The "head" of the combustion zone auger 59 is opposite to that of auger 53, so that, for the assumed direction of rotation of the retort, the former will cause the solid material traveling through the combustion zone to move from right to left through shell 37.

The inner periphery of auger 59 is welded (and sealed) to the outer surface of casing 12 throughout the length of the auger, and the outer periphery of auger 59 is welded (and sealed) to the inner surface of shell 37, at one end only of this last-mentioned auger. Shell 37, auger 59, and casing 12 rotate together as a unit.

Shell 37 and auger 59 together comprise a feeding means. The feeding action which takes place in the combustion zone or fire zone (i.e., the feeding through of the solid material which enters this zone at 39 and at 56) is rather similar to that previously described for the feeding means in preheat pipe 10, although it is of course in the reverse direction. The tumbling action which occurs as shell 37 rotates (previously described in connection wih auger 53) has the effect, in the combustion zone, of constantly exposing a new surface to the air (or other combustion-supporting gas) in this zone, for combustion purposes. As a result, the air does not have to penetrate the material being burned, and in effect, the fire takes place at the surface of the material.

The combustion zone auger 59, due to its large diameter, as well as to the rather large pitch of the auger, is always substantially less than 50% full, and is never full enough to choke. This may be seen in both FIGS. 3 and 4. The hot, gaseous products of combustion necessarily have to follow the helical passage formed by auger 59, the inner wall of shell 37, and the outer wall of casing 12. Thus, the heat is made to completely surround the retort casing 12, so that the outer wall of this casing is maintained in an envelope of heat, to keep it hot.

A plurality of equiangularly-spaced, parallel, longitudinally-extending ribs 60 are provided in the combustion zone. These ribs extend parallel to the axis of rotation of the retort 3, over substantially the entire length of the combustion zone, and each rib is fastened in a series of longitudinally-aligned grooves 61 (see FIG. 5) cut into successive turns of helix or auger 59, at the outer periphery thereof. The ribs 60 thus extend radially inwardly a short distance from the inner wall of shell 37, into the combustion zone (see FIGS. 3 and 4). The ribs 60 pick up the solid material in the combustion zone, as illustrated in FIGS. 3 and 4, and dump it through the gases that are circulating over it, so that more of the carbon (coke) that is in the material passing through this zone will have a chance of being exposed to the oxygen (and thus to burn). The effect of the ribs 60 provides the additional advantage of getting the mass of solid, spent material as near the temperature of the gaseous products of combustion as possible. The hot, recycled material will carry heat to the fresh raw material during the mixing process in the retorting zone, as previously described in connection with FIG. 1.

At the left-hand end of shell 37 (and thus at the outlet of the combustion zone) an aperture 62 is provided in the wall of casing 12, through which aperture the materials (both solid and gaseous) leaving the combustion zone may enter casing 12. The left-hand end of auger 59 is located just to the right of aperture 62. The aperture 62 is somewhat elongated in the axial direction.

The adjustable proportioning device or stream splitter 20, previously referred to in connection with FIG. 1, is located at aperture 62. As previously mentioned, this device operates to split the solid material leaving the combustion or fire zone into two portions, one of which (indicated by arrow 21) is rerun or recycled through the retorting zone in order to heat the fresh raw material, and the other of which (indicated by arrow 13) is removed from the apparatus or machine as waste, but gives up heat to the incoming raw material in the preheat zone.

A vane or damper 63 is mounted for pivotal movement about an axis which extends radially of the apparatus and which is located in a vertical plane passing through the longitudinal midpoint of aperture 62. One edge of vane 63 is rigidly secured to a pivot pin 64 which extends radially through the annular space between shell 37 and casing 12, at the midpoint of the length (measured in a longitudinal direction) of aperture 62; pin 64 is rotatably mounted in shell 37 and is adapted to be manually rotated to an adjusted position by means of an operating handle 65 which extends outwardly through shell 37, to the outside thereof. Vane 63 is rectangular in shape, having a length (measured in the longitudinal direction) equal to one-half the length of aperture 62 (measured in the same direction) and a width (measured in the radial direction) equal to the radial distance between shell 37 and casing 12.

Rotational adjustment of vane 63 in effect varies the relative cross-sectional areas presented by the two halves of aperture 62 to the material leaving the left-hand end of auger 59. The vane 63 thus splits the stream of material leaving the combustion zone auger 59 into two parts, and the angular position of this vane controls or governs the portion of the total which falls into the right-hand half of the aperture 62 (and thus follows the path 21) as compared to the remainder, which falls into the left-hand half of the aperture 62 (and thus follows the path 13). Rotation of vane 63 adjusts or varies the proportioning of the two parts of the stream. It will, of course, be appreciated that the proportioning device 63–64 rotates about the common substantially horizontal axis of the retort, which rotates as an integral unit.

A continuous, uninterrupted auger or helix 66 is mounted within casing 12, using the pipe 10 as its central tube; auger 66 extends from the midpoint of the length of aperture 62 (vertical plane of pivot pin 64) to the right-hand end of pipe 10. The "hand" of auger 66 is the same as that of auger 53, so that, for the assumed direction of rotation of the retort, the former will cause the solid material falling thereon to move from left to right through casing 12.

The inner periphery of auger 66 is welded to the outer surface of pipe 10, and the outer periphery of this auger is welded to the inner surface of casing 12, throughout the length of auger 66. This provides gas-tight seals at both the inner and outer edges of auger 66, and also provides a mechanical coupling between casing 12 and pipe 10, so that the latter tubular element rotates as a unit along with the driven tubular element 12.

As previously described, the spent material, after being heated in the combustion or fire zone by means of the fire burning therein (as fueled by the carbon or coke deposit on this material, and in some cases by raw fuel fed into this zone), leaves the combustion zone at the left-hand end of auger 59 and is dumped into aperture 62. That portion of the hot spent material which passes through the right-hand half of aperture 62 (following the path 21) falls on auger 66 and is thereby caused to move through casing 12 toward the right from aperture 62, into the retorting zone which is located beyond or to the right of pipe 10. This portion of the hot spent material is rerun or recycled through the apparatus, being mixed in the retorting zone with the fresh preheated raw material which reaches this zone by way of pipe 10. As previously described, this hot spent material gives up heat to the fresh raw material in the retorting zone.

The design of the recycle feed portion of the apparatus (e.g., the pitch of auger 66, and the rate of material flow therethrough) is such that auger 66 is filled to approximately the 50% level, sufficient to provide a choking action, similar to that described previously in connection with FIG. 4. This choke feed arrangement for the material being recycled allows such material to be moved into the retorting zone, while preventing the escape of gases from this zone back through casing 12.

In the embodiment illustrated in FIGS. 2A–2B, a continuous, uninterrupted auger or helix 67 is mounted within casing 12, using the pipe 10 as its central tube; auger 67 extends from the midpoint of the length of aperture 62 (vertical plane of pivot pin 64) to the left-hand end of casing 12. The "hand" of auger 67 is opposite to that of auger 53, so that, for the assumed direction of rotation of the retort, the former will cause the solid material falling thereon to move from right to left through casing 12.

The inner periphery of auger 67 is welded to the outer surface of pipe 10, throughout the length of this auger.

That portion of the hot spent material which passes through the left-hand half of aperture 62 (following the path 13) falls on auger 67 and is thereby caused to move through casing 12 toward the left from aperture 62, being removed from the machine as waste. However, on its way out of the machine, it gives up heat to the fresh raw material passing through pipe 10, as a result of conduction through the wall of this pipe.

The waste auger 67, due to its rather large pitch, is always substantially less than 50% full, and is thus never full enough to choke. The combustion gases reaching the left-hand end of the combustion zone auger 59 pass through the left-hand half of aperture 62 and follow the helical passage formed by auger 67, the inner wall of casing 12, and the outer wall of pipe 10, passing from the left-hand end of auger 67 as flue gas into the stack or duct 45.

A paddle or vane assembly (of the type previously referred to, in connection with the retorting zone) may be used at the left-hand end of casing 12, in the waste removal zone, instead of the auger 67.

Figure 6:
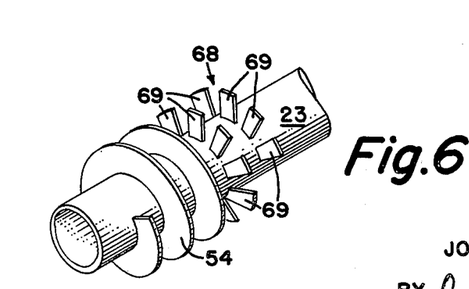
FIG. 6 is a partial isometric view illustrating two different forms of feeding means used in the combustion zone of the retort.

Refer now to FIG. 6, which may be considered to represent a partial view of the generally preferred arrangement of the feeding means in the retorting zone, looking at the right-hand end thereof. The helix or auger 54 may actually extend only from the tattle-tale hole 28 (in tube 23) to the right-hand end of this zone, where choking action is necessary. To the left of hole 28 (i.e., beyond auger 54 in FIG. 6), in the retorting zone, an assembly of vanes or paddles, denoted generally by numeral 68, may be used for feeding the solid material through this zone. No choking action is desired in this portion of the retorting zone, nor is any choking action necessary; in fact, choking in this portion of the retorting zone cannot be tolerated.

The paddle assembly 68 comprises a plurality of spaced rectangular paddles 69 whose inner ends are each secured to the outer surface of tube 23 and which are arranged to form a regular helical progression around the tube 23. The opposite faces of these thin paddles lie at an angle of 45° to the longitudinal axis of tube 23, and opposite ends of successive paddles overlap each other slightly. It will be appreciated that, since the paddles form a regular helical progression, the assembly has a certain pitch, which is the distance (measured longitudinally) between two adjacent turns or revolutions of paddles.

It should be apparent that the paddle assembly 68 functions quite similarly to the auger 53 (previously described) to effect a longitudinal feeding of the particulate solid material reaching the paddles. The tumbling and guiding action which takes place in the paddle assembly 68 (as the paddles rotate, as a unit, about the longitudinal axis of tube 23) is quite similar to that previously described for the feeding means in preheat pipe 10. That is to say, the casing 12 (within which the paddles are located) and paddle assembly 68 together comprise a feeding means which moves the particulate solid material longitudinally of the casing. Of course, since there is open space between the individual paddles 69 of the assembly, no choking action can take place, and gas can move freely in a longitudinal direction, regardless of how full (up to 50%) the casing may become. The paddle assembly 68 may be considered analogous to a discontinuous, interrupted auger.

Paddle assemblies similar to assembly 68 are preferably used instead of augers, at various places in the apparatus of the invention; this has been previously referred to, briefly. In the aforementioned model which was actually built and tested, a paddle assembly or array (similar to that just described in connection with FIG. 6) was used in the waste removal zone, instead of auger 67; a paddle assembly or array was used in the left-hand portion of the retorting zone (to the left of hole 28), instead of the left-hand portion of auger 54; and a paddle assembly was used in the fresh fuel feed zone, instead of auger 58.

The dimensions given hereinabove are those of a prototype model apparatus which was actually built and tested. A unit of commercial size might be 250 inches in diameter and 100 ft. long, handling 6,000 tons of shale per day.

The process and apparatus of this invention possesses several interesting and advantageous features, among which may be mentioned the following. It can produce uncontaminated, rich gas (of 1,000 B.t.u. per cubic foot, for example). Energy is conserved by using the preheater, in which a portion of the heat contained in the hot waste material is utilized to preheat the fresh raw material. Heat for the retorting of the fresh raw material is developed by the actual mixing therewith of the hot spent material. The tattle-tale arrangement 28, 30, etc. enables the operator to determine whether or not the correct amount of material is in the retorting zone. The arrangement, 50, 52, etc. enables supplementary fuel to be added to the combustion zone. Steam can be added to the material in the retorting zone by way of tube 34.

The entire unit can be moved over the earth by means of the caterpillar carriages 2, thus enabling it to be brought adjacent to the site of the raw material. By means of the arrangement 40, 41, etc. the hot flue gas may be recirculated into the combustion zone, thus conserving heat; only enough air to support combustion need be supplied to this zone. Abrasion is minimized by the tumbling action of the material which occurs (wherein the particles tumble over themselves); this tumbling action is radically different from a pushing of the material through the machine. In the combustion zone, air is passed over, rather than through, the material. It is necessary to crush the shale before it is fed to the rotating retort of the invention. However, the fines, as well as coarser material, can be used; in typical prior processes, the fines cannot be used, and must be discarded.

The invention claimed is:

1. A continuous process for treating carbonaceous solid material such as oil shale and the like, including the steps of:
 (a) heating the raw material to be treated to an elevated temperature to volatilize and drive off therefrom volatilizable constituents, leaving spent material having a combustible carbonaceous deposit thereon;
 (b) adding fresh raw material as fuel to the spent material; and
 (c) thereafter burning such fresh raw material along with the combustible deposit on the spent material to heat the spent material to a temperature higher than the first-mentioned temperature, the heat content of at least a portion of the hot spent material being utilized to provide the heat for heating additional raw material to said elevated temperature.

2. Process of distilling carbonaceous solids which comprises passing the subdivided solids through an extended, confined space defining a retorting zone, passing hot solid material through said space in the same direction as said solids and in direct physical contact therewith, said hot solid material giving up heat to said solids as both pass through said space, thereby to bring said solids to an elevated temperature conducive to the volatilization of volatilizable constituents of said solids; thereafter adding fresh carbonaceous solids to the mixture of solids which has passed through the retorting zone; and subjecting both the added fresh solids and combustible solid deposits on said mixture of solids to combustion in another confined space defining a combustion zone, thereby to provide the hot solid material for passage through said retorting zone.

3. Apparatus for continuously treating carbonaceous solid material such as oil shale and the like, comprising an elongate substantially cylindrical vessel mounted for rotation about a substantially horizontal axis, means for rotating said vessel about said axis, means providing in said vessel an elongate radially-inner retorting zone and an elongate radially-outer combustion zone, means mounted in said vessel for feeding solid material to be treated first through said retorting zone and thereafter through said combustion zone, means associated with said combustion zone for causing the retorted material to become heated to an elevated temperature during its passage through said combustion zone, and means for introducing heated retorted material into said retorting zone in intimate contact with the fresh solid material being introduced into this same zone, thereby to heat such fresh solid material to retorting temperature as it passes through said retorting zone and to distill off therefrom volatilizable constituents of the fresh material.

4. Apparatus according to claim 3, characterized in that the direction of movement of the solid material through said retorting zone is opposite to the direction of movement of the solid material through said combustion zone.

5. Apparatus as defined in claim 3, including also means for introducing steam into said retorting zone.

6. Apparatus as defined in claim 3, including also means in said retorting zone for collecting the volatilized constituents as gases and for abstracting them from such zone.

7. Apparatus according to claim 3, characterized in that the means for causing the retorted material to become heated comprises means for introducing air into said combustion zone, thereby to cause combustion of combustible solid deposits on the retorted material.

8. Apparatus in accordance with claim 7, including also means for introducing fresh solid carbonaceous material as fuel into said combustion zone.

9. Apparatus in accordance with claim 7, including also means for introducing hot combustion gases derived from said combustion zone back into such zone.

10. Apparatus for continuously treating carbonaceous solid material such as oil shale and the like, comprising an elongate substantially cylindrical vessel mounted for rotation about a substantially horizontal axis, means for rotating said vessel about said axis, means providing in said vessel an elongate radially-inner preheating zone, an elongate radially-inner retorting zone, and an elongate radially-outer combustion zone, means mounted in said vessel for feeding solid material to be treated through said preheating zone, said retorting zone, and said combustion zone in succession, means associated with said combustion zone for causing the retorted material to become heated to an elevated temperature during its passage through said combustion zone, means for feeding a portion of the heated retorted material through a space in said vessel adjacent to said preheating zone and in heat exchange relation therewith, the last-mentioned heated material giving up heat to the fresh solid material as the latter passes through said preheating zone; and means for introducing the remaining portion of the heated retorted material into said retorting zone in intimate contact with the fresh preheated solid material being introduced into this same zone, thereby to heat such fresh preheated solid material to retorting temperature as it passes through said retorting zone and to distill off therefrom volatilizable constituents of the fresh material.

11. Apparatus according to claim 10, characterized in that the directions of movement of the solid material through said preheating and retorting zones are the same and are opposite to the direction of movement of the solid material through said combustion zone.

12. Apparatus according to claim 10, characterized in that the means for causing the retorted material to become heated comprises means for introducing air into said combustion zone, thereby to cause combustion of combustible solid deposits on the retorted material.

13. Apparatus in accordance with claim 12, including also means for introducing fresh solid carbonaceous material as fuel into said combustion zone.

14. Apparatus in accordance with claim 12, including also means for introducing hot combustion gases derived from said combustion zone back into such zone.

References Cited

UNITED STATES PATENTS

| 2,482,187 | 9/1949 | Johnson | 48—196 |
| 2,723,226 | 11/1955 | Lesher | 201—44 XR |
| 2,725,348 | 11/1955 | Martin et al. | 201—44 XR |
| 2,807,529 | 9/1957 | Tarbox | 48—197 XR |
| 2,832,725 | 4/1958 | Scott | 201—44 XR |
| 2,840,462 | 6/1958 | Gorin | 48—197 |

MORRIS O. WOLK, Primary Examiner

R. E. SERWIN, Assistant Examiner

U.S. Cl. X.R.

48—197; 201—14, 15